(12) United States Patent
Hiramoto et al.

(10) Patent No.: US 9,118,796 B2
(45) Date of Patent: Aug. 25, 2015

(54) POLARIZATION COLOR IMAGE CAPTURE DEVICE

(71) Applicant: Panasonic Corporation, Osaka (JP)

(72) Inventors: Masao Hiramoto, Osaka (JP); Yusuke Monobe, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 79 days.

(21) Appl. No.: 14/112,995

(22) PCT Filed: Mar. 15, 2013

(86) PCT No.: PCT/JP2013/001776
§ 371 (c)(1),
(2) Date: Oct. 21, 2013

(87) PCT Pub. No.: WO2014/020791
PCT Pub. Date: Feb. 6, 2014

(65) Prior Publication Data
US 2015/0130962 A1 May 14, 2015

(30) Foreign Application Priority Data
Aug. 2, 2012 (JP) ................................. 2012-171754

(51) Int. Cl.
| H04N 13/02 | (2006.01) |
| H04N 5/228 | (2006.01) |
| H04N 9/04 | (2006.01) |
| G02B 5/20 | (2006.01) |
| G02B 5/30 | (2006.01) |
| H04N 5/225 | (2006.01) |

(52) U.S. Cl.
CPC ................ *H04N 9/045* (2013.01); *G02B 5/201* (2013.01); *G02B 5/30* (2013.01); *H04N 5/2254* (2013.01)

(58) Field of Classification Search
CPC ..................................................... H04N 9/045
USPC ................................................ 348/222.1, 361
See application file for complete search history.

(56) References Cited

U.S. PATENT DOCUMENTS

| 2009/0278954 A1 | 11/2009 | Kanamori et al. |
| 2009/0290039 A1 | 11/2009 | Kanamori et al. |
| 2010/0102211 A1 | 4/2010 | Murooka et al. |

FOREIGN PATENT DOCUMENTS

| JP | 05-030516 A | 2/1993 |
| JP | 2008-015157 A | 1/2008 |

(Continued)

OTHER PUBLICATIONS

International Search Report for corresponding International Application No. PCT/JP2013/001776 mailed May 14, 2013.

(Continued)

*Primary Examiner* — Joel Fosselman
(74) *Attorney, Agent, or Firm* — Renner, Otto, Boisselle & Sklar, LLP

(57) ABSTRACT

A polarization color image capture device includes: a polarization color filter plate including a first area configured to transmit light that is polarized in a first direction and that falls within a first wavelength range, a second area configured to transmit light that is polarized in a second direction and that falls within a second wavelength range, and a third area configured to transmit incoming light at least partially; an image sensor in which a plurality of unit blocks, each including first, second and third photosensitive cells and first, second and third polarization filters that are arranged to face the first, second and third photosensitive cells, respectively, are arranged on an imaging area, the polarization transmission axis directions of the first, second and third polarization filters being different from each other; and an optical lens that produces an image on the imaging area of the image sensor.

11 Claims, 6 Drawing Sheets

(56) References Cited

FOREIGN PATENT DOCUMENTS

| | | |
|---|---|---|
| JP | 2009-290895 A | 12/2009 |
| JP | 2010-104422 A | 5/2010 |
| JP | 2010-245870 A | 10/2010 |
| WO | WO 2008/149489 A1 | 12/2008 |

OTHER PUBLICATIONS

Form PCT/ISA/237 for corresponding International Application No. PCT/JP2013/001776 dated May 14, 2013.

POLARIZATION COLOR IMAGE CAPTURE DEVICE

TECHNICAL FIELD

The present application relates to a single-panel color image capturing technique for obtaining a color image using a set of optical system and a so-called polarization image sensor in which a polarization filter is arranged so as to face each pixel.

BACKGROUND ART

Recently, the performance and functionality of digital cameras and digital movie cameras that use some solid-state image sensor such as a CCD or a CMOS (which will be sometimes simply referred to herein as an "image sensor") have been enhanced to an astonishing degree. In particular, the size of a pixel structure for use in an image sensor has been further reduced these days thanks to rapid development of semiconductor device processing technologies, thus getting an even greater number of pixels and drivers integrated together in an image sensor. As a result, the resolution of an image sensor has lately increased rapidly from around one million pixels to ten million or more pixels in a matter of few years. While the performance of an image sensor has been further enhanced, new functions have recently been added one after another. For example, a polarization imaging camera which can obtain two-dimensional polarization information by arranging a polarization filter on each pixel of an image sensor has been developed just lately.

In a polarization imaging camera, an array patterned polarizers is arranged in front of the image sensor. Based on the luminance values of multiple proximate pixels, polarization information about the principal axis direction, average luminance and polarization component intensity of polarized light can be obtained.

Ordinarily, a polarization imaging camera can obtain only a monochrome image. Thus, to obtain a color image using a polarization imaging camera, a color filter needs to be arranged over each pixel of the image sensor. For example, in the image capture devices disclosed in Patent Documents Nos. 1 and 2, a plurality of patterned polarizers and a plurality of color filters that are arranged in a mosaic pattern are stacked one upon the other over a plurality of pixels of the image sensor. As a result, polarization information and color information can be obtained at the same time.

CITATION LIST

Patent Literature

Patent Document No. 1: PCT International Application Publication No. 2008/149489
Patent Document No. 2: Japanese Laid-Open Patent Publication No. 2009-290895

SUMMARY OF INVENTION

Technical Problem

The present application provides an image capturing technique by which polarization information and color information can be obtained using a different optical configuration and a different kind of signal processing from the conventional ones.

Solution to Problem

To overcome the problem, a polarization color image capture device according to an aspect of the present invention includes: a polarization color filter plate including a first area configured to transmit light that is polarized in a first direction and that falls within a first wavelength range, a second area configured to transmit light that is polarized in a second direction and that falls within a second wavelength range, and a third area configured to transmit incoming light at least partially; an image sensor in which a plurality of unit blocks, each including first, second and third photosensitive cells and first, second and third polarization filters that are arranged to face the first, second and third photosensitive cells, respectively, are arranged on an imaging area, the polarization transmission axis directions of the first, second and third polarization filters being different from each other; an optical lens that produces an image on the imaging area of the image sensor; and a signal processing section that processes a signal supplied from the image sensor.

This general and particular aspect can be implemented as a system, a method, a computer program or a combination thereof.

Advantageous Effects of Invention

According to an embodiment of the present invention, color information can be calculated by performing an arithmetic operation between pixels. According to another embodiment, polarization information can also be obtained by performing an arithmetic operation between pixels.

DESCRIPTION OF EMBODIMENTS

Figure 1:
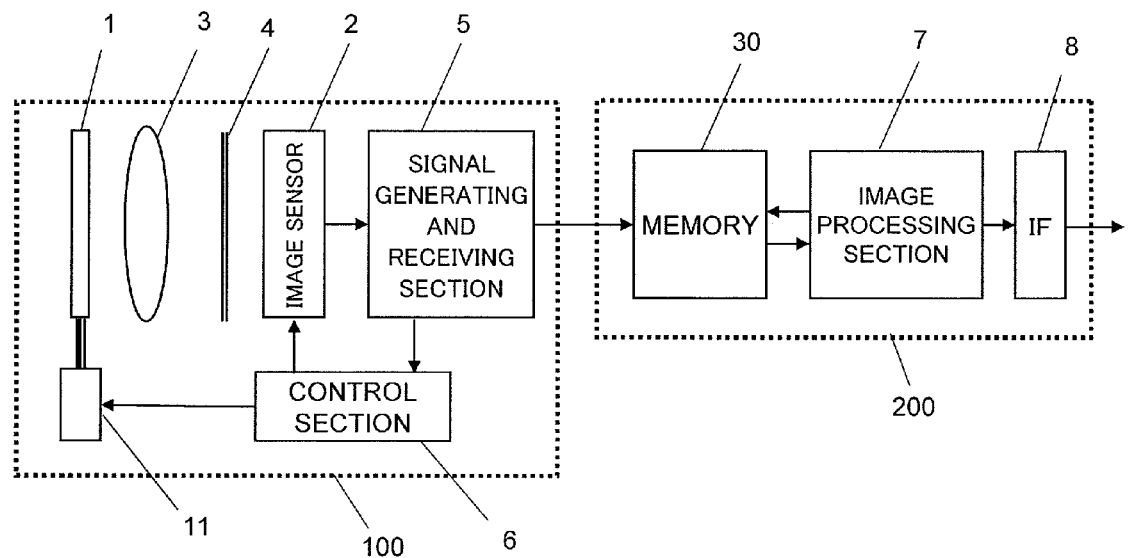
[FIG. 1] A diagram illustrating a configuration for an image capture device according to a first embodiment.

An exemplary embodiment of the present invention can be outlined as follows.

(1) A polarization color image capture device according to an aspect of the present invention includes: a polarization color filter plate including a first area configured to transmit light that is polarized in a first direction and that falls within a first wavelength range, a second area configured to transmit light that is polarized in a second direction and that falls within a second wavelength range, and a third area configured to transmit incoming light at least partially; an image sensor in which a plurality of unit blocks, each including first, second and third photosensitive cells and first, second and third polarization filters that are arranged to face the first, second and third photosensitive cells, respectively, are arranged on an imaging area, the polarization transmission axis directions of the first, second and third polarization filters being different from each other; an optical lens that produces an image on the imaging area of the image sensor; and a signal processing section that processes a signal supplied from the image sensor.

(2) In one embodiment of the polarization color image capture device of (1), the third area is configured to transmit light that is polarized in a third direction and that falls within a third wavelength range.

(3) In one embodiment of the polarization color image capture device of (1) or (2), the signal processing section includes an image processing section that generates a color image based on signals supplied from the first to third photosensitive cells of each unit block.

(4) In one embodiment of the polarization color image capture device of one of (1) to (3), the polarization transmission axis directions of the first, second and third areas agree with the polarization transmission axis directions of the first, second and third polarization filters, respectively.

(5) In one embodiment of the polarization color image capture device of one of (1) to (4), each of the first, second and third areas is formed by stacking a color filter and a polarization filter one upon the other.

(6) In one embodiment of the polarization color image capture device of one of (1) to (5), the polarization transmission axis directions of the first to third areas are different from each other by 60 degrees.

(7) In one embodiment of the polarization color image capture device of one of (1) to (6), the first, second and third wavelength ranges correspond to red, green and blue rays' wavelength ranges, respectively.

(8) In one embodiment, the polarization color image capture device of one of (1) to (7) further includes a drive mechanism that is able to insert and remove the polarization color filter plate onto/from an optical path.

(9) In one embodiment, the polarization color image capture device of (8) further includes a control section that controls the drive mechanism and the image sensor so that a first image capturing session is performed with the polarization color filter plate removed from the optical path and that a second image capturing session is performed with the polarization color filter plate inserted onto the optical path.

(10) In one embodiment of the polarization color image capture device of (9), the signal processing section includes an image processing section which generates polarization information about light that has come from a subject based on signals supplied from the first to third photosensitive cells of each unit block as a result of the first image capturing session and which also generates a color image based on signals supplied from the first to third photosensitive cells of each unit block as a result of the second image capturing session and the polarization information.

(11) A polarization color filter plate according to an aspect of the present invention is used in the polarization color image capture device of one of (1) to (10). The polarization color filter plate includes a first area configured to transmit light that is polarized in a first direction and that falls within a first wavelength range, a second area configured to transmit light that is polarized in a second direction and that falls within a second wavelength range, and a third area configured to transmit incoming light at least partially.

(12) An imaging processing device according to an aspect of the present invention is configured to generate an image based on signals supplied from the polarization color image capture device of one of (1) to (10). The imaging processing device generates a color image based on signals supplied from the first to third photosensitive cells of each unit block of the image sensor.

(13) An image processing program according to an aspect of the present invention is designed to generate an image based on signals supplied from the polarization color image capture device of one of (1) to (10). The image processing program makes a computer perform the step of generating a color image based on signals supplied from the first to third photosensitive cells of each unit block of the image sensor.

Hereinafter, specific embodiments of the present invention will be described with reference to the accompanying drawings. In the following description, any pair of components shown in multiple drawings and having the same or almost the same function will be identified herein by the same reference numeral.

(Embodiment 1)

FIG. 1 is a block diagram illustrating an overall configuration for a polarization color image capture device as a first embodiment. The polarization color image capture device of this embodiment is a digital electronic camera and includes an image capturing section 100 and a signal processing section 200 which generates a signal representing an image (i.e., an image signal) based on a signal supplied from the image capturing section 100.

The image capturing section 100 includes an imager 2 (which will be referred to herein as an "image sensor") with a number of photosensitive cells that are arranged on its imaging area, a polarization color filter plate 1 which has three light transmitting areas with mutually different transmitting wavelength ranges and respectively different polarization transmission axis directions, an optical lens 3 which produces an image on the imaging area of the image sensor 2, an infrared cut filter 4, and a drive mechanism (polarization color filter moving section) 11 which is configured to insert and remove the polarization color filter plate 1 onto/from the shooting optical system. A polarization filter is arranged over each photosensitive cell (which will be referred to herein as a "pixel") of the image sensor 2. In this embodiment, four pixels and four polarization filters which face those four pixels together form a single unit element, and a number of such unit elements are arranged two-dimensionally on the imaging area. In each unit element, three out of the four polarization filters have respectively different polarization transmission axis directions.

The image capturing section 100 further includes a signal generating and receiving section 5 which not only generates a fundamental signal to drive the image sensor 2 but also receives the output signal of the image sensor 2 and sends it to the signal processing section 200, and a control section 6 which drives the image sensor 2 in accordance with the fundamental signal generated by the signal generating and receiving section 5. The control section 6 also controls the operation of the polarization color filter moving section 11 in parallel with the operation of the image sensor 2. The image sensor 2 is typically a CCD or CMOS sensor, which may be fabricated by known semiconductor device processing technologies. The signal generating and receiving section 5 and the control section 6 may be implemented as an LSI such as a CCD driver.

The signal processing section 200 includes an image processing section 7 which processes the output signal of the image capturing section 100 to generate image signals, a memory 30 which stores the image signals and various kinds of data generated during the signal processing, and an interface (IF) section 8 which sends out the image signals thus generated to an external device. The image processing section 7 may be a combination of a hardware component such as a known digital signal processor (DSP) and a software program for use to perform image processing involving the image signal generation. The memory 30 may be a DRAM, for example. And the memory 30 not only stores the signal supplied from the image capturing section 100 but also temporarily retains the image data that has been generated by the image processing section 7 or compressed image data. These image data are then output to either a storage medium or a display section by way of the interface section 8.

The polarization color image capture device of this embodiment actually further includes an electronic shutter, a viewfinder, a power supply (or battery), a flashlight and other known components. However, description thereof will be omitted herein, because none of them are essential components that should be described in detail to allow the reader to understand how the present invention works. Also, this configuration is only an example. Thus, in this embodiment, additional components other than polarization color filter plate 1, the image sensor 2 and the image processing section 7 may be implemented as an appropriate combination of known elements.

Hereinafter, the configuration of the image capturing section 100 will be described in detail. In the following description, when a position or direction in the image capturing area is mentioned, the xy coordinates shown in the drawings will be used.

Figure 2:
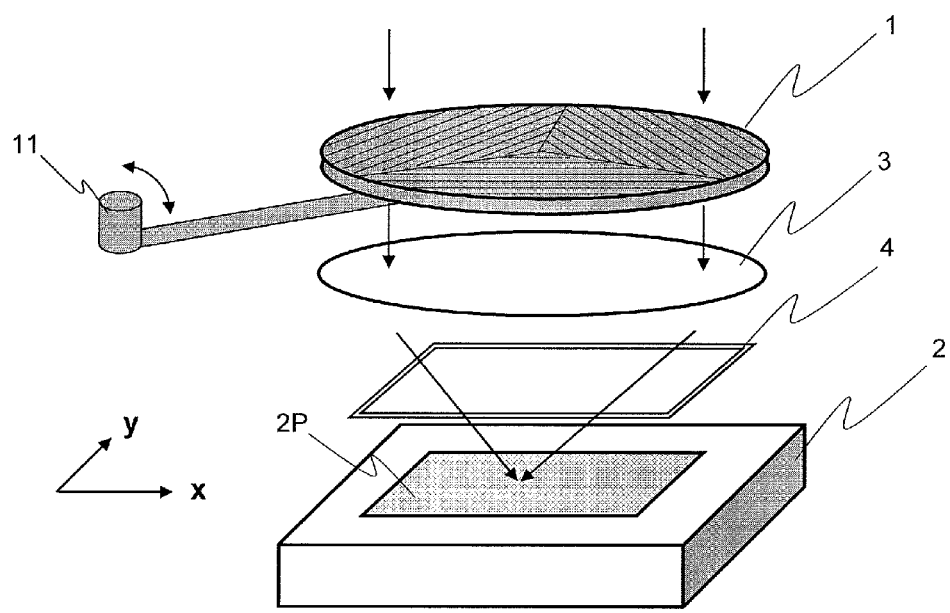
[FIG. 2] A schematic representation illustrating an image capturing section according to the first embodiment.

FIG. 2 schematically illustrates the relative arrangement of the optical lens 3, infrared cut filter 4, polarization color filter plate 1, polarization color filter moving section 11 and image sensor 2 in the image capturing section 100. The optical lens 3 may be a lens unit comprised of groups of lenses. But the optical lens 3 is drawn in FIG. 2 as a single lens for the sake of simplicity. The optical lens 3 is a known lens and condenses the incoming light and images the light on the imaging area 2P of the image sensor 2. It should be noted that the relative arrangement of the respective members shown in FIG. 2 is only an example and does not always have to be adopted according to the present invention. For example, there is no problem if the positions of the optical lens 3 and the infrared cut filter 4 are exchanged with each other. Also, the optical lens 3 and the polarization color filter plate 1 may be exchanged with each other. Or the optical lens 3 and the polarization color filter plate 1 may even be integrated with each other.

Figure 3:
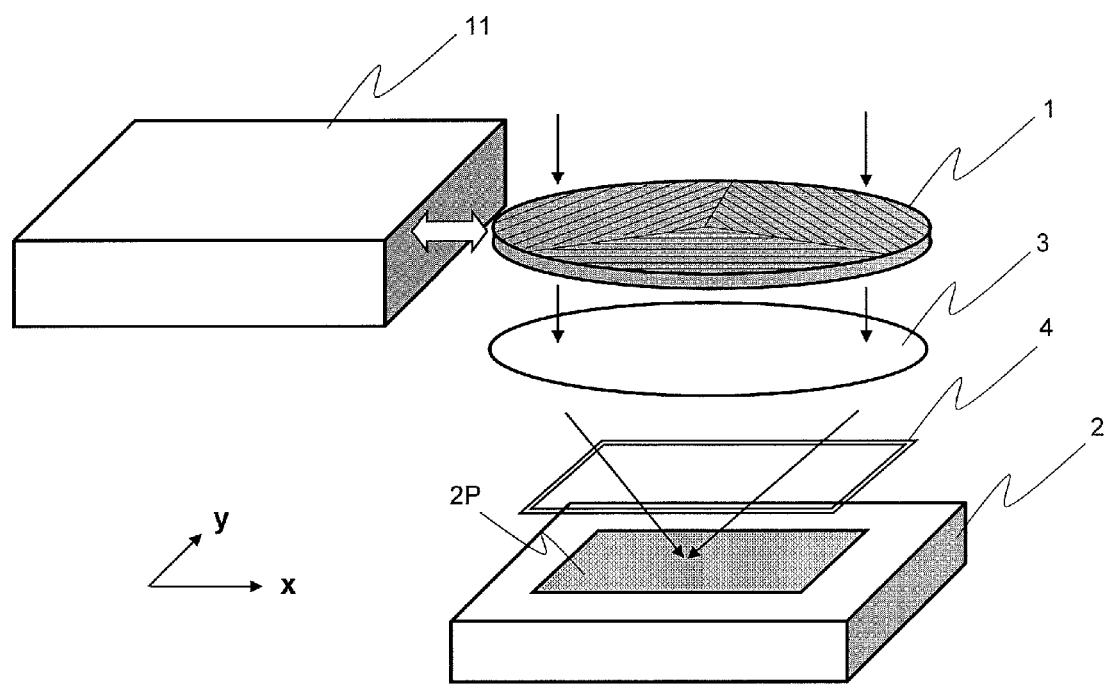
[FIG. 3] A schematic representation illustrating another exemplary configuration for a polarization color filter moving section 11.

In this embodiment, the infrared cut filter 4 is an optical filter of the type absorbing light, of which the wavelength is longer than approximately 650 nm. However, the infrared cut filter 4 does not always have to be a light absorbing optical filter but may also be a reflective optical filter which is implemented as a stack of multiple films with different refractive indices. The polarization color filter moving section 11 is a rotating mechanism which has a motor and which can insert and remove the polarization color filter plate 1 onto/from the optical axis of the shooting optical system. The polarization color filter moving section 11 removes the polarization color filter plate 1 from the shooting optical system in getting polarization information of the subject but inserts the polarization color filter plate 1 into the shooting optical system in getting color information. It should be noted that as long as the polarization color filter moving section 11 is configured to be able to insert and remove the polarization color filter plate 1 into/from the optical path, the polarization color filter moving section 11 does not have to be such a rotating mechanism but may also have any other configuration. For example, the polarization color filter moving section 11 may be configured to move the polarization color filter plate 1 in a single direction as shown in FIG. 3.

Figure 4:
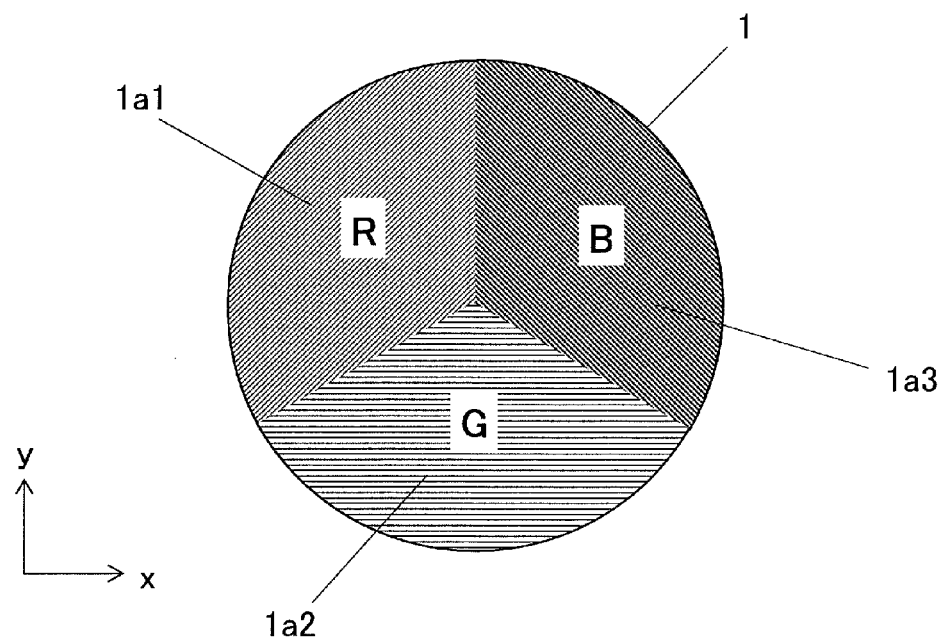
[FIG. 4] A plan view illustrating the polarization color filter plate 1 of the first embodiment.

FIG. 4 is a plan view schematically illustrating the polarization color filter plate 1. In this embodiment, the light transmitting area of the polarization color filter plate 1 is evenly devided into three areas $1a1$, $1a2$ and $1a3$ that have mutually different polarization properties. Supposing the horizontal direction (i.e., the x direction) is 0 degrees, the polarization transmission axis directions of these three areas $1a1$, $1a2$ and $1a3$ are designed to be +60, 0 and −60 degrees, respectively. In addition, these three areas $1a1$, $1a2$ and $1a3$ have not only mutually different polarization properties but also respectively different color properties (i.e., wavelength selectivities) as well. Specifically, these areas $1a1$, $1a2$ and $1a3$ are designed so as to transmit only red (R), green (G) and blue (B) rays, respectively. In this embodiment, these properties are realized by bonding together a polarization filter having an intended polarization transmission axis and a color filter having intended wavelength selectivity.

Figure 5:
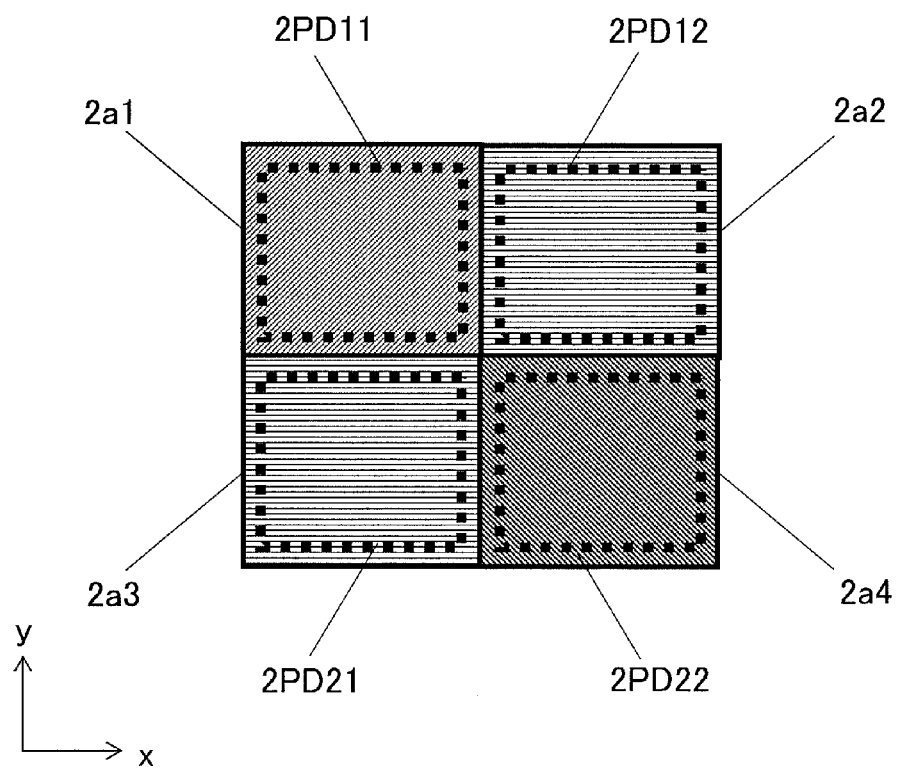
[FIG. 5] A diagram illustrating a basic arrangement for an image sensor 2 according to the first embodiment.

FIG. 5 illustrates a basic pixel arrangement for the image sensor 2. The image sensor 2 has a configuration in which a number of unit elements, each having a basic arrangement in which pixels are arranged in two columns and two rows, are arranged two-dimensionally on the imaging area. Each single unit element includes four photosensitive cells $2PD11$, $2PD12$, $2PD21$, and $2PD22$ and four polarization filters $2a1$, $2a2$, $2a3$, and $2a4$ which are arranged to cover those photosensitive cells. Supposing the horizontal direction (i.e., x direction) is the reference direction and is defined by an angle of 0 degrees, the polarization filter $2a1$ at the row 1, column 1 position has its polarization transmission axis in the +60 degree direction, the polarization filters $2a2$ and $2a3$ at the row 1, column 2 position and at the row 2, column 1 position have their polarization transmission axis in the 0 degree direction, and the polarization filter $2a4$ at the row 2, column 2 position has its polarization transmission axis in the −60 degree direction. These polarization filters $2a1$ to $2a3$ may be implemented as photonic crystals, for example.

By adopting such a configuration, the light entering this image capture device at the time of shooting has its polarization and color components filtered while being transmitted through each area of the polarization color filter plate 1 and its polarization components further filtered while being transmitted through each polarization filter of the image sensor 1. Also, since the polarization color filter plate 1 has three areas $1a$, $1a2$ and $1a3$ with mutually different transmission wavelength ranges, light in which R, G and B rays are mixed together is incident on each pixel. In this embodiment, the output signals of respective pixels are processed by the image processing section 7 thereby generating a color image and polarization information.

Hereinafter, the operation and signal processing to be carried out by the polarization color image capture device of this embodiment will be described. First of all, it will be described how to get color information in a situation where the light that has come from the subject and entered this image capture device is supposed to have no polarization property. After that, it will be described how to get polarization information.

In getting color information, an image is captured with the polarization color filter plate 1 inserted into the shooting optical system by the polarization color filter moving section 11. The image sensor 2 receives the light that has come from the subject through the polarization color filter plate 1, optical lens 3, and infrared cut filter 4 and photoelectrically converts the light, thereby outputting an electrical signal representing the subject image. And based on this electrical signal, a signal representing an image (i.e., an image signal) is generated.

The photosensitive cells 2PD11, 2PD12, 2PD21 and 2PD22 of each unit element of the image sensor 2 output photoelectrically converted signals representing the quantities (or intensities) of the light received by them. If those photoelectrically converted signals are identified by 2PD11s, 2PD12s, 2PD21s, and 2PD22s, respectively, those signals are given by the following Equations (1) to (4):

$$2PD11s = Rs + Gs\cos^2(\pi/3) + Bs\cos^2(2\pi/3) \quad (1)$$

$$2PD12s = Rs\cos^2(\pi/3) + Gs + Bs\cos^2(\pi/3) \quad (2)$$

$$2PD21s = Rs\cos^2(\pi/3) + Gs + Bs\cos^2(\pi/3) \quad (3)$$

$$2PD22s = Rs\cos^2(2\pi/3) + Gs\cos^2(\pi/3) + Bs \quad (4)$$

In these Equations (1) to (4), Rs, Gs and Bs represent signals indicating the intensities of light rays that would be transmitted through the respective areas 1a1, 1a2 and 1a3 of the polarization color filter plate 1 and incident on a single pixel if the polarization color filter plate 1 and the respective polarization filters of the image sensor 2 had no polarization properties. That is to say, Rs, Gs and Bs are signals representing the red, green and blue components of the subject. Also, in Equations (1) to (4), the transmittance in a situation where two polarization filters having the same polarization transmission axis direction lie one upon the other is supposed to be 100% and the transmittance in a situation where two polarization filters, of which the polarization directions are different from each other by 90 degrees, lie one upon the other is supposed to be 0% for the sake of simplicity. It should be noted that as these transmittances do not actually become 100% or 0%, equations obtained by multiplying each term of Equations (1) to (4) by a correction coefficient according to the transmittances of the polarization filters may be used.

The image sensor 2 outputs the signals represented by these Equations (1) to (4) (which will be sometimes referred to herein as "pixel signals") on a unit element basis. Those pixel signals are read by the control section 6 and the signal generating and receiving section 5 from the image sensor 2. The pixel signals thus read are then sent to the signal processing section 200, in which those pixel signals received are written in the memory 30 and the written signals are processed by the image processing section 7.

Hereinafter, the relation between the pixel signals 2PD11s, 2PD12s, 2PD21s, and 2PD22s and the color signals Rs, Gs and Bs will be described. As can be seen from Equations (1) to (4), the pixel signals 2PD11s, 2PD12s (which is the same as 2PD21s) and 2PD22s and the color signals Rs, Gs and Bs have a relation represented by the following Equation (5):

$$\begin{pmatrix} 2PD11s \\ 2PD12s \\ 2PD22s \end{pmatrix} = \begin{pmatrix} 1 & 1/4 & 1/4 \\ 1/4 & 1 & 1/4 \\ 1/4 & 1/4 & 1 \end{pmatrix} \begin{pmatrix} Rs \\ Gs \\ Bs \end{pmatrix} \quad (5)$$

Since the relation represented by this Equation (5) is satisfied, Rs, Gs and Bs can be given by the following Equation (6) using 2PD11s, 2PD12s (or 2PD21s) and 2PD22s.

$$\begin{pmatrix} Rs \\ Gs \\ Bs \end{pmatrix} = (10/9) \times \begin{pmatrix} 1 & -1/5 & -1/5 \\ -1/5 & 1 & -1/5 \\ -1/5 & -1/5 & 1 \end{pmatrix} \begin{pmatrix} 2PD11s \\ 2PD12s \\ 2PD22s \end{pmatrix} \quad (6)$$

The image processing section 7 performs the arithmetic operation represented by Equation (6) on a unit element basis, thereby obtaining color signals Rs, Gs and Bs. Then, the image processing section 7 generates a color image based on these color signals and outputs the color image to an external device via the interface (IF) section 8.

By performing this signal processing, a color image can be obtained even without providing a color filter for each pixel of the image sensor 2. According to this configuration, colorization using a different arrangement of color filters can also get done by replacing the color filter portions of the polarization color filter plate 1. Since colorization can get done by signal processing as long as color filters in three different colors are used, the combination of color filters to use does not have to be the exemplary combination described above. For example, since the incoming light can be used more efficiently by using color filters in the complementary colors magenta (Mg), cyan (Cy) and yellow (Ye), the sensitivity of the color image can be further increased easily. According to the conventional methods, however, color filters cannot be replaced easily, and there is no choice but to provide different color filters for the image sensor by patterning, which requires a lot of cost. In contrast, according to this embodiment, such colorization using an alternative arrangement of color filters is realized at a low cost.

Figure 6A:
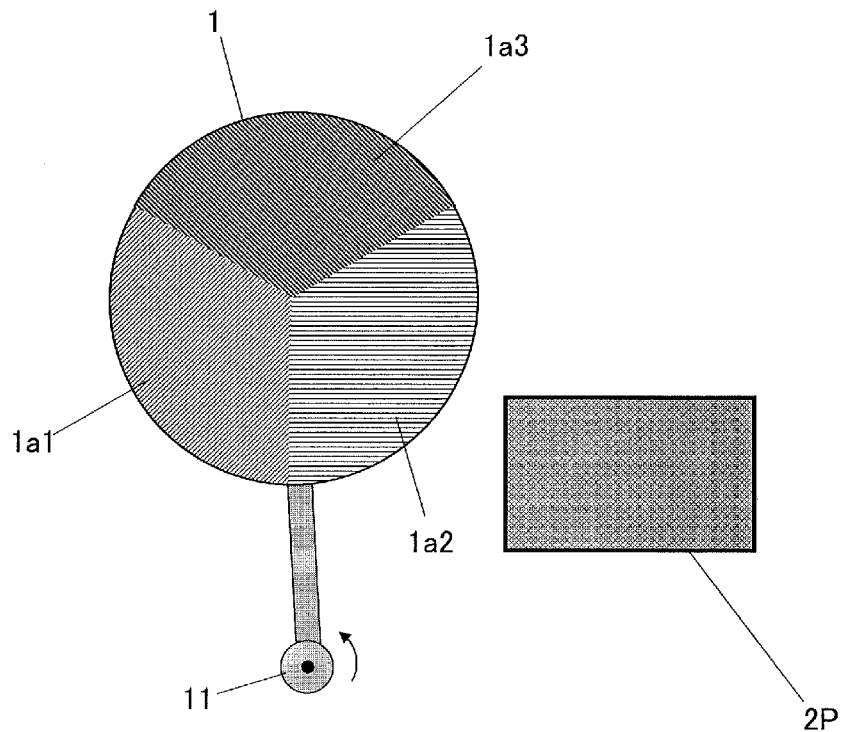
[FIG. 6A] A plan view schematically illustrating a state where the polarization color filter plate 1 is removed from the optical path.

Next, it will be described how to get polarization information about the light that has come from the subject on the supposition that the light has some polarization property. FIG. 6A is a plan view schematically illustrating the relative arrangement of the polarization color filter plate 1 and the image sensor 2 when the polarization information needs to be gotten. In FIG. 6A, illustration of the optical lens 3 and the infrared cut filter 4 is omitted. To get the polarization information, an image is captured with the polarization color filter plate 1 removed from the shooting optical system by the polarization color filter moving section 11 as shown in FIG. 6A. In this case, the image sensor 2 receives the light that has come from the subject through the optical lens 3 and the infrared cut filter 4 and photoelectrically converts the light. The value of the output signal of each photosensitive cell is determined by the property of the polarization filter that is arranged to face that photosensitive cell and by the polarization property of the light that has come from the subject. Specifically, if the amplitude of the luminance of the polarized light that has come from the subject is A, the angle indicating the polarization transmission axis direction of the polarization filter at the image sensor is $\omega$, the angle indicating the direction in which the luminance of the polarized light that has come from the subject becomes maximum is $\phi$, and the average luminance of the polarized light that has come from the subject is M, the value PDs of a pixel signal is generally calculated by the following Equation (7):

$$PDs = A\cos(2\omega - 2\phi) + M \quad (7)$$

By using this Equation (7), the respective pixel signals 2PD11s, 2PD12s, 2PD21s, and 2PD22s of the image sensor 2 are represented by the following Equations (8) to (11):

$$2PD11s = A\cos(2\pi/3 - 2\phi) + M \quad (8)$$

$$2PD12s = A\cos(2\phi) + M \quad (9)$$

$$2PD21s = A\cos(2\phi) + M \quad (10)$$

$$2PD22s = A\cos(-2\pi/3 - 2\phi) + M \quad (11)$$

In Equations (8) to (11), A, φ and M are unknown numbers and are determined on a subject's position basis. Since there are three unknown numbers, those unknown numbers can be determined by using three relational expressions including them. That is why A, φ and M can be obtained by using Equations (8), (9) (or (10)) and (11). That is to say, the polarization information about the subject can be obtained by calculating A, φ and M using three out of the four signals supplied from the four pixels that are basically arranged in two columns and two rows and by substituting them into Equation (7).

Figure 6B:
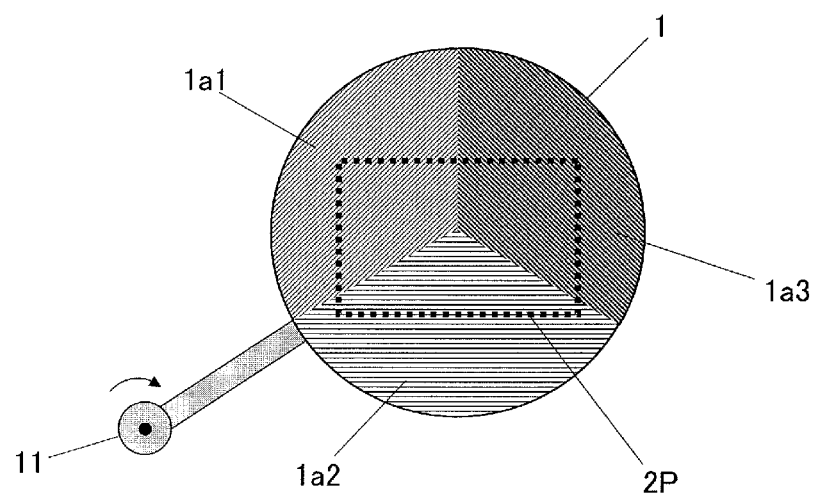
[FIG. 6B] A plan view schematically illustrating a state where the polarization color filter plate 1 is inserted into the optical path.

Next, it will be described how to get color information in a situation where light having polarization property has come from the subject. FIG. 6B is a plan view schematically illustrating the relative arrangement of the polarization color filter plate 1 and the image sensor 2 when color information needs be obtained. To get color information, first of all, an image is captured with the polarization color filter plate 1 removed from the shooting optical system as shown in FIG. 6A. Next, an image is captured with the polarization color filter plate 1 inserted into the shooting optical system as shown in FIG. 6B. That is to say, the image capture device captures images of the subject twice and generates color information based on the information about those two images captured.

Figure 7:
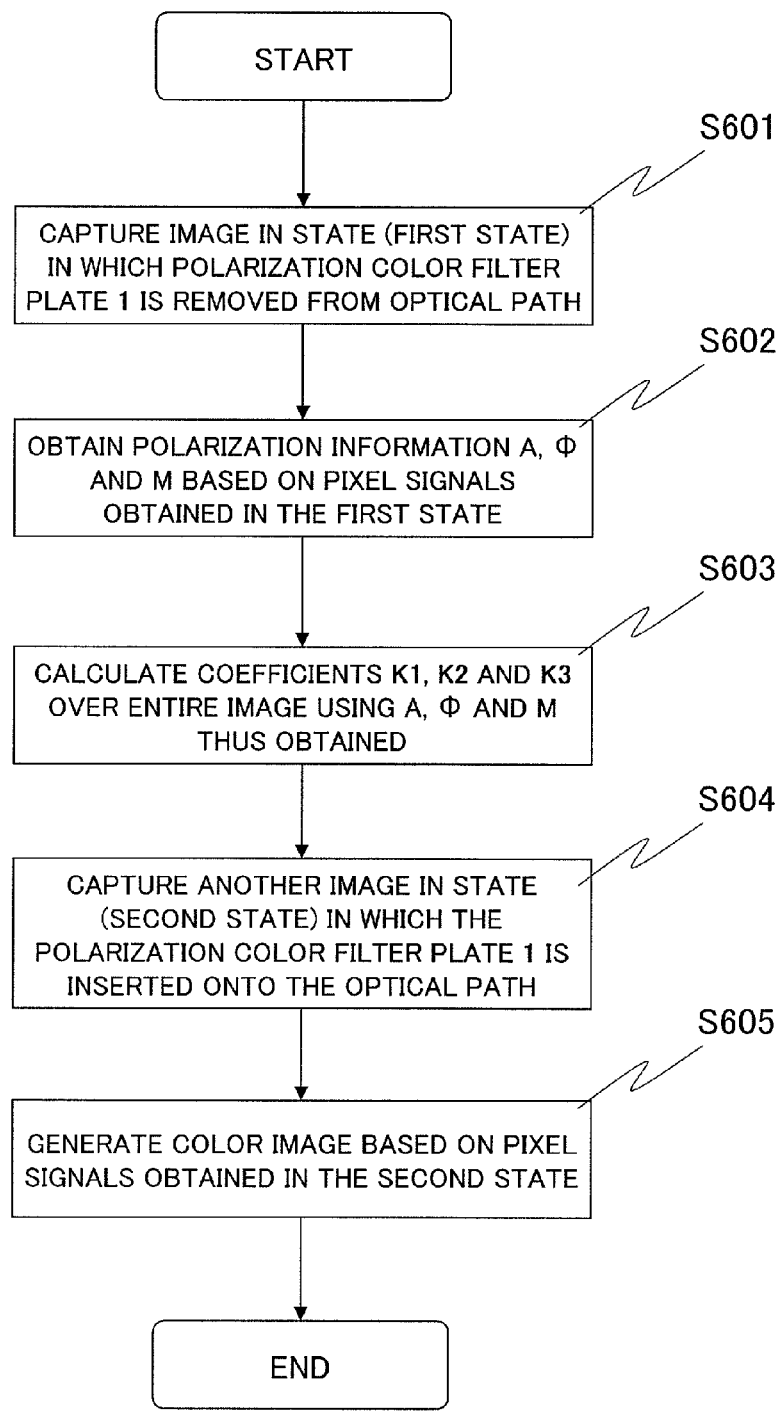
[FIG. 7] A flowchart showing the procedure of the operation of generating a color image in a situation where the light that has come from the subject has a polarization property.

Hereinafter, the procedure of the processing to be carried out when color information needs to be obtained will be described with reference to FIG. 7. First of all, the image capture device captures an image in a first state in which the polarization color filter plate 1 is removed from the optical path of the light that has come from the subject (in Step S601). In this processing step, the control section 6 sends a control signal to the polarization color filter moving section 11, thereby getting the polarization color filter plate 1 removed from the optical path.

Next, the image processing section 7 obtains A, φ and M of Equation (7) over the entire image based on the pixel signals that have been obtained in the first state (in Step S602). Even though A, φ and M are numerical values that actually vary from one point on the image to another, the same reference signs A, φ and M will be used in the following description irrespective of the point on the image. Using A, φ and M thus obtained, the image processing section 7 calculates the coefficients k1, k2 and k3 given by the following Equations (12) to (14) over the entire image (in Step S603):

$$k1 = \frac{A\cos(2\pi/3 - 2\phi) + M}{M} \quad (12)$$

$$k2 = \frac{A\cos(2\phi) + M}{M} \quad (13)$$

$$k3 = \frac{A\cos(-2\pi/3 - 2\phi) + M}{M} \quad (14)$$

Subsequently, the image capture device captures another image in a second state in which the polarization color filter plate 1 is inserted onto the optical path (in Step S604). In this processing step, the control section 6 sends a control signal to the polarization color filter moving section 11, thereby getting the polarization color filter plate 1 moved to a position where the plate 1 covers the imaging area 2P of the image sensor 2.

Thereafter, the image processing section 7 generates a color image by Equations (12) to (14) based on the image that has been captured in the second state (in Step S605). Specifically, the image processing section 7 generates a color image by the following Equations (15) to (18) corresponding to Equations (1) to (4):

$$2PD11s = k1Rs + k2Gs\cos^2(\pi/3) + k3Bs\cos^2(2\pi/3) \quad (15)$$

$$2PD12s = k1Rs\cos^2(\pi/3) + k2Gs + k3Bs\cos^2(\pi/3) \quad (16)$$

$$2PD21s = k1Rs\cos^2(\pi/3) + k2Gs + k3Bs\cos^2(\pi/3) \quad (17)$$

$$2PD22s = k1Rs\cos^2(2\pi/3) + k2Gs\cos^2(\pi/3) + k3Bs \quad (18)$$

These Equations (15) to (18) are obtained by multiplying Rs, Gs and Bs by k1, k2 and k3, respectively, and are relational expressions that take the polarization property of the light that has come from the subject into consideration. If the light that has come from the subject is non-polarized light, then coefficient A included in k1 to k3 becomes equal to zero and Equations (15) to (18) becomes the same as Equations (1) to (4). According to Equations (15) to (18), the relation between the color signals Rs, Gs and Bs and the pixel signals 2PD11s, 2PD12s (or 2PD21s) and 2PD22s can be represented by the following Equation (19):

$$\begin{pmatrix} 2PD11s \\ 2PD12s \\ 2PD22s \end{pmatrix} = \begin{pmatrix} k1 & k2/4 & k3/4 \\ k1/4 & k2 & k3/4 \\ k1/4 & k2/4 & k3 \end{pmatrix} \begin{pmatrix} Rs \\ Gs \\ Bs \end{pmatrix} \quad (19)$$

Furthermore, according to Equation (19), Rs, Gs and Bs can be represented by the following Equation (20) using 2PD11s, 2PD12s (or 2PD21s) and 2PD22s:

$$\begin{pmatrix} Rs \\ Gs \\ Bs \end{pmatrix} = (10/9) \times \begin{pmatrix} 1/k1 & -1/5k2 & -1/5k3 \\ -1/5k1 & 1/k2 & -1/5k3 \\ -1/5k1 & -1/5k2 & 1/k3 \end{pmatrix} \begin{pmatrix} 2PD11s \\ 2PD12s \\ 2PD22s \end{pmatrix} \quad (20)$$

In Step S605, the image processing section 7 generates a color image by performing an arithmetic operation based on Equation (20). The color image thus generated is output to an external device via the interface (IF) section 8.

As can be seen, by capturing images twice by inserting and removing the polarization color filter plate 1 into/from the shooting optical system, color information can also be generated based on those two images obtained, even if the subject has a polarization property.

The embodiment described above uses an image sensor 2 in which three kinds of polarization filters are arranged on pixels and a polarization color filter plate 1 with three areas 1a1, 1a2 and 1a3 which have the same area and which have the same polarization property as the three kinds of polarization filters in the shooting optical system. As these three areas 1a1, 1a2 and 1a3 have the functions of R, G and B color filters, RGB color information can be obtained by performing an arithmetic operation between the output signals of the image sensor 2. Also, by capturing an image with the polarization color filter plate 1 removed from the optical path, the subject's polarization information can be obtained. And by using the image that has been obtained with the polarization color filter plate 1 and the images that has been obtained without the polarization color filter plate 1, color information can also be obtained even from a subject with a polarization property, which is one of advantageous effects to be achieved by this embodiment.

In the embodiment described above, the polarization transmission axis directions of the areas 1a1, 1a2 and 1a3 of the polarization color filter plate 1 and the polarization transmission axis directions of the polarization filters 2a1, 2a2 (or 2a3) and 2a4 of the image sensor 2 are both supposed to be 60, 0 and −60 degrees. However, this is just an example. Any other set of three different directions may also be used as the polarization transmission axis directions. Also, in the embodiment described above, the transmission wavelength ranges of the areas 1a1, 1a2 and 1a3 of the polarization color filter plate 1 are supposed to be the same as the wavelength ranges of red (R), green (G) and blue (B) rays, respectively. However, this is only an example and in no way limiting. Rather, as long as the transmission wavelength ranges of these areas are associated with light rays in three different colors, RGB color information can also be calculated by performing an arithmetic operation.

Furthermore, even though the polarization color filter plate 1 is supposed to be a circular one in the embodiment described above, the polarization color filter plate 1 may also have an elliptical, polygonal or any other suitable shape. If necessary, the polarization color filter plate 1 may also be divided into four or more areas, or an opaque area may be provided between different areas. Moreover, the respective areas of the polarization color filter plate 1 do not have to have the same planar area. If the planar areas of these areas are different from each other, arithmetic equations, obtained by adding an appropriate coefficient to each term of Equations (1) to (4) according to their area ratio, may be used.

Hereinafter, a more generalized exemplary configuration will be described with reference to FIGS. 8 and 9 as a modified example of the first embodiment.

Figure 8:
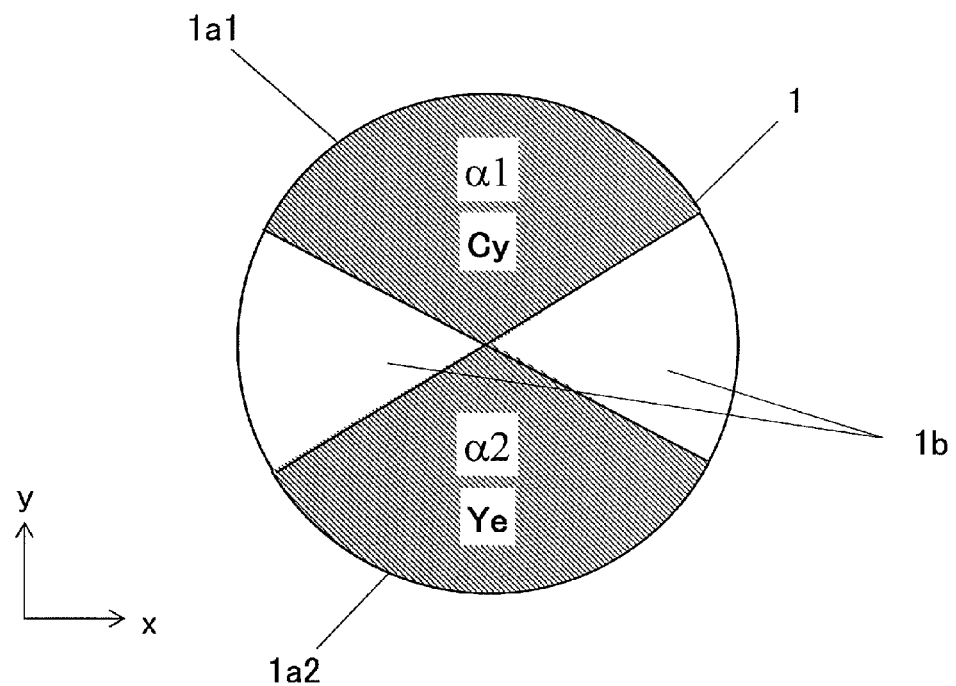
[FIG. 8] A plan view illustrating a modified example of the polarization color filter plate 1.

FIG. 8 illustrates another exemplary configuration for the polarization color filter plate 1. In this exemplary configuration, the polarization color filter plate 1 has two different polarization color areas 1a1 and 1a2 and transparent areas 1b. In this example, these polarization color areas 1a1 and 1a2 and the transparent areas 1b all have the same planar area, and the transparent areas 1b are two areas that have been devided in the x direction. The polarization transmission axis directions of the polarization color areas 1a and 1a2 are directions that define angles α1 and α2, respectively, with respect to the x direction. Meanwhile, the polarization color area 1a1 is configured to transmit a light ray falling within the color cyan (Cy) wavelength range (i.e., the colors green and blue wavelength ranges) and to absorb or reflect a light ray falling within the color red wavelength range. On the other hand, the polarization color area 1a2 is configured to transmit a light ray falling within the color yellow (Ye) wavelength range (i.e., the colors red and green wavelength ranges) and to absorb or reflect a light ray falling within the color blue wavelength range. In FIG. 8, the polarization color areas 1a1 and 1a2 are located in the upper and lower parts of the polarization color filter plate 1. However, any other arbitrary arrangement may also be adopted.

Figure 9:
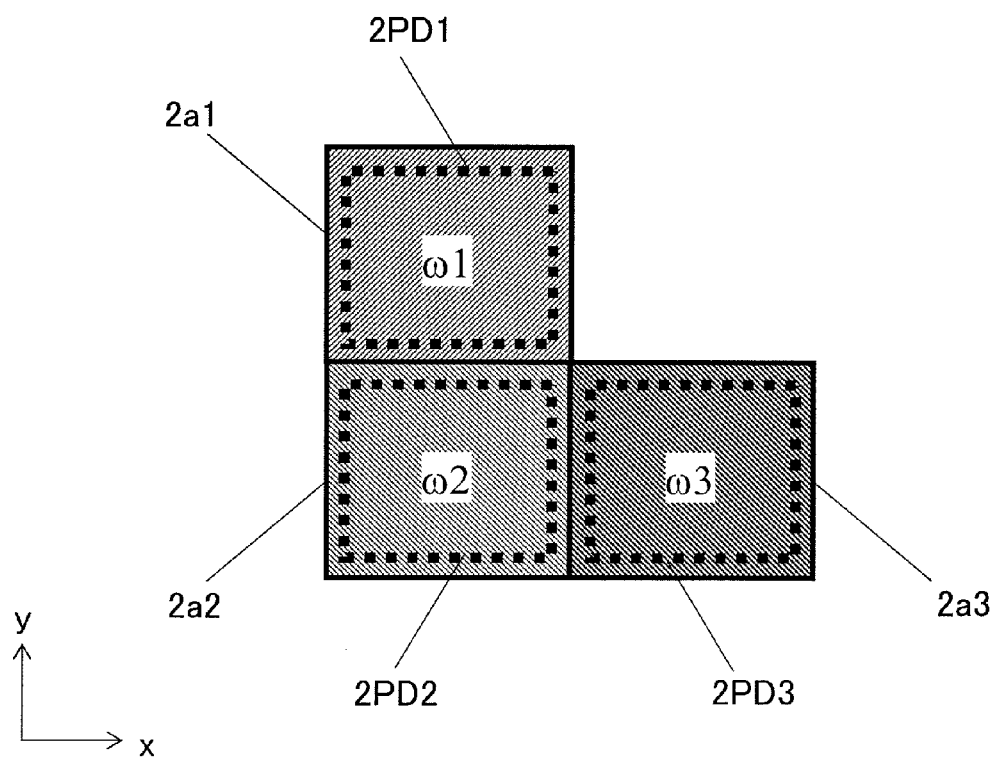
[FIG. 9] A diagram illustrating a modified example of a basic pixel arrangement for the image sensor 2.

FIG. 9 illustrates another exemplary configuration for a unit element of the image sensor 2. In this example, each single unit element includes three photosensitive cells 2PD1, 2PD2, and 2PD3 and three polarization filters 2a1, 2a2 and 2a3 which are arranged so as to face them. In this case, the polarization transmission axis directions of the polarization filters 2a1, 2a2 and 2a3 define angles ω1, ω2 and ω3, respectively, with respect to the x direction. Although the photosensitive cells 2PD1 and 2PD2 are arranged in the y direction and the photosensitive cells 2PD2 and 2PD3 are arranged in the x direction in this example, this is just an example and any other pixel arrangement may also be adopted.

Let use suppose the transmittance when non-polarized light is incident on the polarization filters 2a1 to 2a3 is T (where T<1). In the exemplary configuration shown in FIGS. 8 and 9, the pixel signals 2PD1s, 2PD2s, and 2PD3s to be supplied from the three photosensitive cells 2PD1, 2PD2 and 2PD3 are represented by the following Equations (21) to (23), respectively:

$$2PD1s = (Gs + Bs)\cos^2(\alpha 1 - \omega 1) + \qquad (21)$$
$$(Rs + Gs)\cos^2(\alpha 2 - \omega 1) + (Rs + gs + Bs)T$$
$$= \{\cos^2(\alpha 2 - \omega 1) + T\}Rs + \{\cos^2(\alpha 1 - \omega 1) +$$
$$\cos^2(\alpha 2 - \omega 1) + T\}Gs + \{\cos^2(\alpha 1 - \omega 1) + T\}Bs$$

$$2PD2s = (Gs + Bs)\cos^2(\alpha 1 - \omega 2) + \qquad (22)$$
$$(Rs + Gs)\cos^2(\alpha 2 - \omega 2) + (Rs + Gs + Bs)T$$
$$= \{\cos^2(\alpha 2 - \omega 2) + T\}Rs + \{\cos^2(\alpha 1 - \omega 2) +$$
$$\cos^2(\alpha 2 - \omega 2) + T\}Gs + \{\cos^2(\alpha 1 - \omega 2) + T\}Bs$$

$$2PD3s = (Gs + Bs)\cos^2(\alpha 1 - \omega 3) + \qquad (23)$$
$$(Rs + Gs)\cos^2(\alpha 2 - \omega 3) + (Rs + Gs + Bs)T$$
$$= \{\cos^2(\alpha 2 - \omega 3) + T\}Rs + \{\cos^2(\alpha 1 - \omega 3) +$$
$$\cos^2(\alpha 2 - \omega 3) + T\}Gs + \{\cos^2(\alpha 1 - \omega 3) + T\}Bs$$

On the right side of these Equations (21) to (23), the coefficients of the Rs, Gs and Bs terms are known quantities. That is why the color signals Rs, Gs and Bs can be obtained based on these Equations (21) to (23). Consequently, even when the configurations shown in FIGS. 8 and 9 are adopted, color information can also be generated as in the embodiment described above. The respective areas of the polarization color filter plate 1 and the respective polarization filters of the image sensor 2 should be designed so that the determinant of the matrix represented by the coefficients of the respective terms on the right side of Equations (21) to (23) does not become equal to zero.

As can be seen, the polarization color filter plate 1 may be configured to have at least two areas with mutually different transmission wavelength ranges and polarization transmission axes and at least one area with no polarization property. The one area with no polarization property does not have to be a transparent area but may also be an area which transmits incoming light at least partially. For example, a color filter having a different transmission wavelength range from the areas 1a1 and 1a2 may be provided for the areas 1b. In this case, even if two color filters have different transmission wavelength ranges, their wavelength ranges may partially overlap with each other as in the example of Cy and Ye described above. Also, each single unit element of the image sensor 2 may include at least three photosensitive cells and three polarization filters which are arranged so as to face the photosensitive cells and of which the polarization transmission axis directions are different from each other.

In the embodiments described above, the image processing section built in the image capture device is supposed to perform image processing. However, such image processing may also be carried out by another device which is provided independently of the image capture device. For example, even if a signal that has been obtained by an image capture device including the image capturing section 100 of the embodiment described above is loaded into another device (imaging processing device) to get a program defining the signal arithmetic processing described above executed by a computer built in that imaging processing device, the effects of the embodiments described above can also be achieved.

INDUSTRIAL APPLICABILITY

A polarization color image capture device according to an aspect of the present invention can be used effectively in any camera that ever uses a solid-state image sensor. Examples of those cameras include consumer electronic cameras such as digital cameras and digital movies, solid-state camcorders for broadcasting use, and solid-state surveillance cameras for industrial use.

REFERENCE SIGNS LIST 1 polarization color filter plate
1a1 polarization filter which transmits R ray and of which polarization transmission axis direction is 60 degrees
1a2 polarization filter which transmits G ray and of which polarization transmission axis direction is 0 degrees
1a3 polarization filter which transmits B ray and of which polarization transmission axis direction is −60 degrees
2 image sensor
2a1 polarization filter of which polarization transmission axis direction is 60 degrees
2a2 polarization filter of which polarization transmission axis direction is 0 degrees
2a3 polarization filter of which polarization transmission axis direction is −60 degrees
2P image sensor's imaging area
2PD11, 2PD12, 2PD21, 2PD22 photosensitive cell
3 optical lens
4 infrared cut filter
5 signal generating and receiving section
6 control section
7 image processing section
8 interface section
11 polarization color filter moving section (drive mechanism)
30 memory
100 image capturing section
200 signal processing section

The invention claimed is:

1. A polarization color image capture device comprising:
a polarization color filter plate including a first area configured to transmit light that is polarized in a first direction and that falls within a first wavelength range, a second area configured to transmit light that is polarized in a second direction and that falls within a second wavelength range, and a third area configured to transmit incoming light at least partially;
an image sensor in which a plurality of unit blocks, each including first, second and third photosensitive cells and first, second and third polarization filters that are arranged to face the first, second and third photosensitive cells, respectively, are arranged on an imaging area, the polarization transmission axis directions of the first, second and third polarization filters being different from each other;
an optical lens that produces an image on the imaging area of the image sensor;
a signal processing section that processes a signal supplied from the image sensor;
a drive mechanism that is able to insert and remove the polarization color filter plate onto/from an optical path; and
a control section that controls the drive mechanism and the image sensor so that a first image capturing session is performed with the polarization color filter plate removed from the optical path and that a second image capturing session is performed with the polarization color filter plate inserted onto the optical path.

2. The polarization color image capture device of claim 1, wherein the third area is configured to transmit light that is polarized in a third direction and that falls within a third wavelength range.

3. The polarization color image capture device of claim 1, wherein the signal processing section includes an image processing section that generates a color image based on signals supplied from the first to third photosensitive cells of each said unit block.

4. The polarization color image capture device of claim 1, wherein the polarization transmission axis directions of the first, second and third areas agree with the polarization transmission axis directions of the first, second and third polarization filters, respectively.

5. The polarization color image capture device of claim 1, wherein each of the first, second and third areas is formed by stacking a color filter and a polarization filter one upon the other.

6. The polarization color image capture device of claim 1, wherein the polarization transmission axis directions of the first to third areas are different from each other by 60 degrees.

7. The polarization color image capture device of claim 1, wherein the first, second and third wavelength ranges correspond to red, green and blue rays' wavelength ranges, respectively.

8. The polarization color image capture device of claim 1, wherein the signal processing section includes an image processing section which generates polarization information about light that has come from a subject based on signals supplied from the first to third photosensitive cells of each said unit block as a result of the first image capturing session and which also generates a color image based on signals supplied from the first to third photosensitive cells of each said unit block as a result of the second image capturing session and the polarization information.

9. A polarization color filter plate for use in the polarization color image capture device of claim 1, the filter plate including a first area configured to transmit light that is polarized in a first direction and that falls within a first wavelength range, a second area configured to transmit light that is polarized in a second direction and that falls within a second wavelength range, and a third area configured to transmit incoming light at least partially.

10. An imaging processing device that generates an image based on signals supplied from the polarization color image capture device of claim 1,
wherein the imaging processing device generates a color image based on signals supplied from the first to third photosensitive cells of each said unit block of the image sensor.

11. An image processing program stored on a non-transitory computer readable medium that is designed to generate an image based on signals supplied from the polarization color image capture device of claim 1,
wherein the image processing program makes a computer perform the step of generating a color image based on signals supplied from the first to third photosensitive cells of each said unit block of the image sensor.

* * * * *